US012811460B2

(12) United States Patent
Kalisz et al.

(10) Patent No.: US 12,811,460 B2
(45) **Date of Patent: *Nov. 24, 2026**

(54) BUSBAR BASE PLATE

(71) Applicant: BorgWarner Inc., Auburn Hills, MI (US)

(72) Inventors: Mariusz J. Kalisz, Noblesville, IN (US); Timothy J. Alfermann, Carmel, IN (US); Timothy J. Sailors, Jr., Carmel, IN (US); Arlen Phillip Suter, Pendleton, IN (US)

(73) Assignee: BorgWarner Inc., Auburn Hills, MI (US)

( * ) Notice: Subject to any disclaimer, the term of this patent is extended or adjusted under 35 U.S.C. 154(b) by 203 days.

This patent is subject to a terminal disclaimer.

(21) Appl. No.: 18/742,732

(22) Filed: Jun. 13, 2024

(65) Prior Publication Data

US 2024/0333061 A1 Oct. 3, 2024

Related U.S. Application Data

(63) Continuation-in-part of application No. 17/818,704, filed on Aug. 9, 2022, now Pat. No. 12,470,104.

(51) Int. Cl.
*H02K 3/28* (2006.01)
*H02K 3/50* (2006.01)

(52) U.S. Cl.
CPC ............... *H02K 3/28* (2013.01); *H02K 3/505* (2013.01); *H02K 2203/03* (2013.01); *H02K 2203/06* (2013.01); *H02K 2203/09* (2013.01)

(58) Field of Classification Search
CPC ........... H02K 2203/03; H02K 2203/06; H02K 2203/09; H02K 5/225; H02K 3/50
See application file for complete search history.

(56) References Cited

U.S. PATENT DOCUMENTS 11,165,301 B2 11/2021 Alsman et al.
2021/0143698 A1* 5/2021 Alsman .................. H02K 5/225
(Continued)

FOREIGN PATENT DOCUMENTS

CN 209982207 U * 1/2020 ............. H02K 7/116
WO WO-2018030480 A1 * 2/2018 ............. H02K 3/522

OTHER PUBLICATIONS

WO-2018030480-A1 Machine Translation (Year: 2018).*
CN-209982207-U Machine Translation (Year: 2020).*

*Primary Examiner* — Oluseye Iwarere
*Assistant Examiner* — Masoud Vaziri
(74) *Attorney, Agent, or Firm* — Maginot, Moore & Beck, LLP

(57) ABSTRACT

A stator assembly of an electric machine includes of stator leads extending outward from one end of the stator core. A busbar assembly includes a busbar body supporting a plurality of lead connectors that are connected to corresponding stator leads. An alignment plate is interposed between the stator assembly and the busbar assembly. The alignment plate includes a rigid base plate having a bottom face supported on the top surface of the end turns and an opposite top face supporting the busbar body. The base plate defines a plurality of openings corresponding to the plurality of stator leads and arranged to be aligned with the stator leads. One or more of the stator leads extends through a corresponding one of the plurality of openings. Each of the openings is sized and configured for a close running fit with the stator lead or leads extending therethrough. Epoxy is positioned in the openings and assists in securing the leads to the alignment plate.

22 Claims, 9 Drawing Sheets

(56) References Cited

U.S. PATENT DOCUMENTS

| | | | | |
|---|---|---|---|---|
| 2021/0194308 | A1 | 6/2021 | Jones et al. | |
| 2021/0344245 | A1* | 11/2021 | Wittmann | H02K 15/12 |
| 2021/0359567 | A1 | 11/2021 | Neet et al. | |
| 2023/0098997 | A1* | 3/2023 | Fiederling | H02K 5/225<br>310/71 |
| 2023/0198329 | A1* | 6/2023 | Conner | H02K 15/35<br>310/71 |
| 2025/0357816 | A1* | 11/2025 | Finger-Albert | H02K 3/50 |

* cited by examiner

BUSBAR BASE PLATE

CROSS-REFERENCE TO RELATED APPLICATIONS

This application is a continuation-in-part of U.S. application Ser. No. 17/818,704, filed Aug. 9, 2022, the entire contents of which are incorporated herein by reference.

FIELD

This application relates to the field of electric machines, more particularly to winding arrangements and terminal connections for electric machines.

BACKGROUND

Electric machines are typically designed to meet specific operating requirements and space constraints. Examples of design features that contribute to operating performance include stator size, rotor size, type and arrangement of the windings, and any of various other design parameters as will be recognized by those of ordinary skill in the art. All operating requirements for the electric machine must be met while also meeting certain space constraints that are dependent upon the application for the electric machine. For automotive applications, space within the engine compartment is limited, and designers must be concerned with the overall diameter and length of the electric machine. Accordingly, limiting the size of an electric machine without sacrificing performance features is important.

Stators of electric machines include windings that include a plurality of winding leads (or conductors). These winding leads must be connected to electronics equipment associated with the electric machine, such as an inverter or rectifier. A typical arrangement for the winding leads is to route them in the space directly over the end turns (i.e., "over" meaning the space axially outward from the end turns but at a similar radial position).

With reference to FIG. 1, a stator with internal connections for winding leads is disclosed. The stator 20 includes a stator core 22 with a winding arrangement 30 positioned on the stator core 22. A plurality of winding leads 38 extend from the winding arrangement 30 and a busbar assembly 28 is connected to the leads 38. The busbar assembly 28 provides various internal connections between winding leads 38. The stator core 22 is comprised of a ferromagnetic material and is typically formed from a plurality of steel sheets that are stamped and stacked upon one another to form a lamination stack, as will be recognized by those of ordinary skill in the art. As shown in FIG. 1, the stator core 22 is generally cylindrical in shape as defined by a center axis 21 and two ends 26, 27. The stator core 22 further includes an outer perimeter surface 22*a* defining an outer diameter of the core 22, and an inner perimeter surface 22*b* defining an inner diameter of the core 22.

The stator core 22 is configured to retain the winding arrangement 30 within slots 24 of the stator core 22. In at least one embodiment, the winding arrangement 30 (which may also be referred to herein as "windings") is formed from a plurality of elongated wires (e.g., copper wires) that are continuously wound within the slots 24 on the stator core 22 in order to form the windings. The conductors of the completed winding arrangement 30 form a plurality of three-phase windings (e.g., phase U windings, phase V windings, and phase W windings) with multiple winding paths for each phase (i.e., both parallel and series-connected paths within each phase). The three phase windings can be star/wye ("Y") connected or delta ("Δ") connected windings.

The conductors that form the completed windings on the stator core include in-slot portions 34, end turns 36, and winding leads 38. The in-slot portions 34 are straight portions of the conductors located within the slots 24 of the stator core 22. Each in-slot portion 34 carries current from one end 26/27 of the stator core 22 to the opposite end 27/26 of the stator core.

With continued reference to FIG. 1, the end turns 36 (which may also be referred to herein as "end loops") are the conductor portions where a change of direction occurs outside of the slots 24 at an end of the stator core 22. The end turns 36 may include bent portions and/or welded portions of the conductors (which welded portions forming end turns 36 may also be referred to herein as "common welds"). Each end turn 36 includes a conductor that exits one slot at an end of the stator core 22, is bent/twisted away from the slot (i.e., at a first angle), forms an end loop (e.g., a "U-turn" or other 180° change of direction), is bent/twisted toward a different slot (at a complementary second degree), and then enters that different slot on the same end of the stator core. As such, each end turn 36 extends between two in-slot portions 34 and across a number of slots at an end of the stator core 22. The end turns 36 are collectively represented in FIG. 1 by a conglomeration of conductors that form a disc-like shape at each end 26/27 of the stator core 22.

The winding leads 38 are conductor portions that provide an entry/exit to one of the winding paths. Each conductor forming a winding lead 38 is connected to an in-slot portion of the windings. In particular, each winding lead 38 exits a slot 24, and then extends in an axial direction away from the end turns 36 to a point where the lead 38 terminates, axially outward from the end turns 36. In other words, the leads 38 are shaped similar to half an end turn 36, wherein the lead 38 extends out of a slot and follows the same path as the other end turns, but instead of including a U-turn, the lead continues to extend in an axial direction away from the end loops. Each of the leads 38 terminates at an end of the lead that is axially distant from the end turns 36. As shown in FIG. 1 each end of the leads is joined to a busbar/conductor provided within the busbar assembly 28.

The busbar assembly 28 is mounted on the stator assembly 20 by feeding the leads 38 of the winding arrangement 30 through openings in the body of the busbar assembly. Proper alignment between the busbar assembly and the stator leads is important to facilitate the assembly of the busbar to the stator. With the leads 38 properly positioned within the busbar assembly, the leads are welded to lead connectors in the busbar assembly. The proximity of this welding operation to the winding arrangement 30 can compromise the stator leads and end turns 36. It would be desirable to provide means for ensuring proper alignment of the busbar assembly with the stator leads to facilitate assembly, and to minimize relative movement between the busbar assembly and the stator during and after assembly. It would also be desirable to provide means to prevent damage to the winding arrangement of the stator when the stator leads are being welded to the busbar connectors. While it would be desirable to provide an electric machine that provides one or more of these or other advantageous features as may be apparent to those reviewing this disclosure, the teachings disclosed herein extend to those embodiments which fall within the scope of the appended claims, regardless of whether they accomplish one or more of the above-mentioned advantages.

SUMMARY OF THE DISCLOSURE

In accordance with at least one embodiment of the disclosure, a base plate is provided as an interface between a busbar assembly and a stator assembly in an electric machine. The stator assembly includes a stator core having opposite ends and a winding arrangement positioned on the core. The winding arrangement includes a plurality of stator leads extending outward from one of the ends of the core. The busbar assembly includes a busbar body supporting a plurality of lead connectors, each of the plurality of lead connectors connected to at least one of the plurality of stator leads. In one feature of the disclosure, the alignment plate is interposed between the stator assembly and the busbar assembly. The alignment plate includes a rigid base plate having a bottom face supported on the top surface of the end turns and an opposite top face supporting the busbar body. A plurality of openings is defined through the base plate, in which the openings corresponding to the plurality of stator leads. The openings are arranged on the base plate to be aligned with the plurality of stator leads, with one or a pair of the stator leads extending through a corresponding one of the openings. The openings are sized and configured for a close running fit with the stator leads extending there-through.

In another aspect of the disclosure, an alignment plate is provided for mounting a busbar assembly to a stator, in which the stator includes a winding arrangement with a plurality of stator leads projecting from a stator core, and the busbar assembly includes a busbar body carrying a plurality of lead connectors corresponding to the plurality of stator leads. The alignment plate comprises a rigid base plate having a bottom face configured to be seated on the end turns and an opposite top face configured to receive the busbar body mounted thereon. A plurality of openings are defined through the base plate, with the plurality of openings corresponding to the plurality of stator leads and arranged on the base plate to be aligned with and receive the plurality of stator leads when the bottom face is seated on the stator core. Each opening of the plurality of openings is sized and configured for a close running fit with a corresponding one or a corresponding pair of the stator leads aligned with the opening.

In other aspects, the alignment plate can include alignment features supporting the busbar assembly on the alignment plate in proper alignment for electrical engagement between the busbar lead connections and the stator leads. Additionally, the alignment plate may include features to provide a more secure and robust busbar assembly and connection to the stator windings. Exemplary features include retainers with compartments that receive winding end turns. Epoxy may be inserted into the openings in the base plate and in various features to assist in retaining the base plate, busbar and winding arrangement together as a secure unit that is resistant to damage from prolonged exposure to vibration during operation of a vehicle or other end use product.

The alignment plate facilitates assembly of the busbar assembly on the stator assembly by ensuring that the busbar is properly aligned as it is placed on the stator core. The alignment plate also provides protection for the stator and the winding arrangement during the welding operation to connect the stator leads to the lead connectors. The alignment plate further includes features that provide for a strong and robust connection of the busbar to the winding assembly.

DETAILED DESCRIPTION

Figure 1:
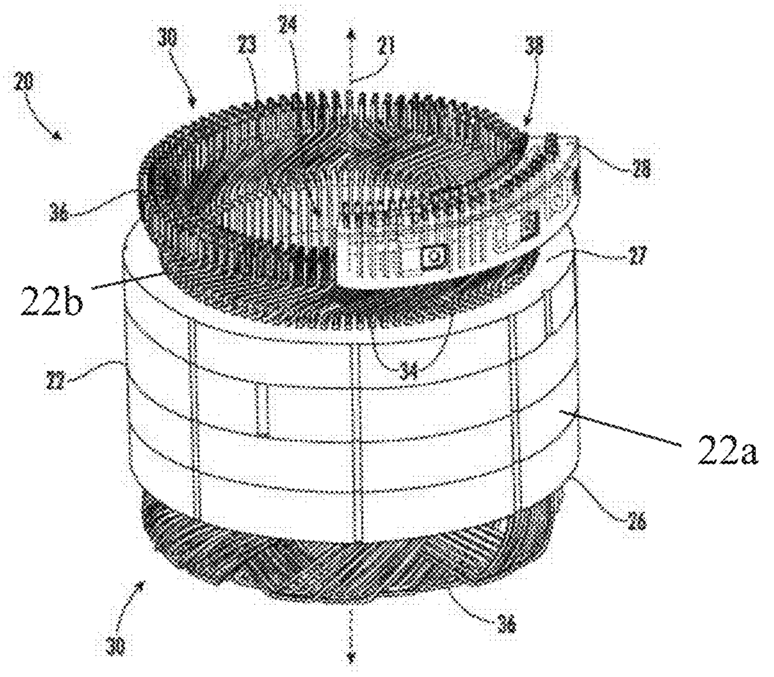
FIG. 1 is a perspective view of a stator assembly for an electric motor with a busbar assembly mounted thereon.

An alignment plate 100 and an associated busbar assembly 120 is disclosed herein. The alignment plate 100 includes a base plate 102 with a bottom face **102*a* configured to be supported on the top surface of the end turns 36 or on the top surface of the stator core 22, and an upper face 102*b* configured to receive the busbar assembly 120 seated thereon. The busbar assembly 120 includes a body 122 that is seated on the base plate 102, phase terminals 123 and lead connectors 125 configured to provide an electrical connection between the stator leads 38 and the phase terminals 123. The base plate may be arcuate so that the base plate is in the form of an arc segment configured to follow the curvature of the stator core, with an inboard edge 105 and an outboard edge 111 generally contiguous with or between the inner and outer perimeter surfaces 22***a*, 22*b* of the stator core, respectively.

Alignment Plate with Base Plate Having Planar Bottom Face

Figure 2:
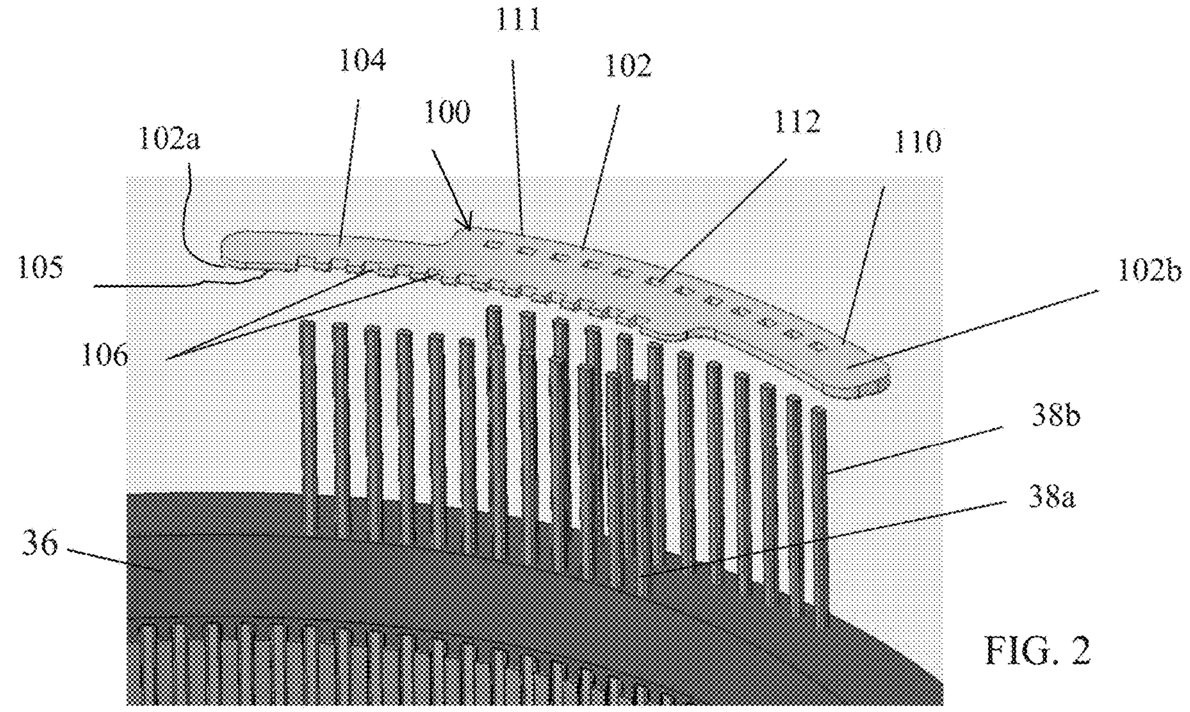
FIG. 2 is an enlarged perspective view of an alignment plate according to one embodiment of the disclosure aligned with stator leads of a stator.
Figure 3:
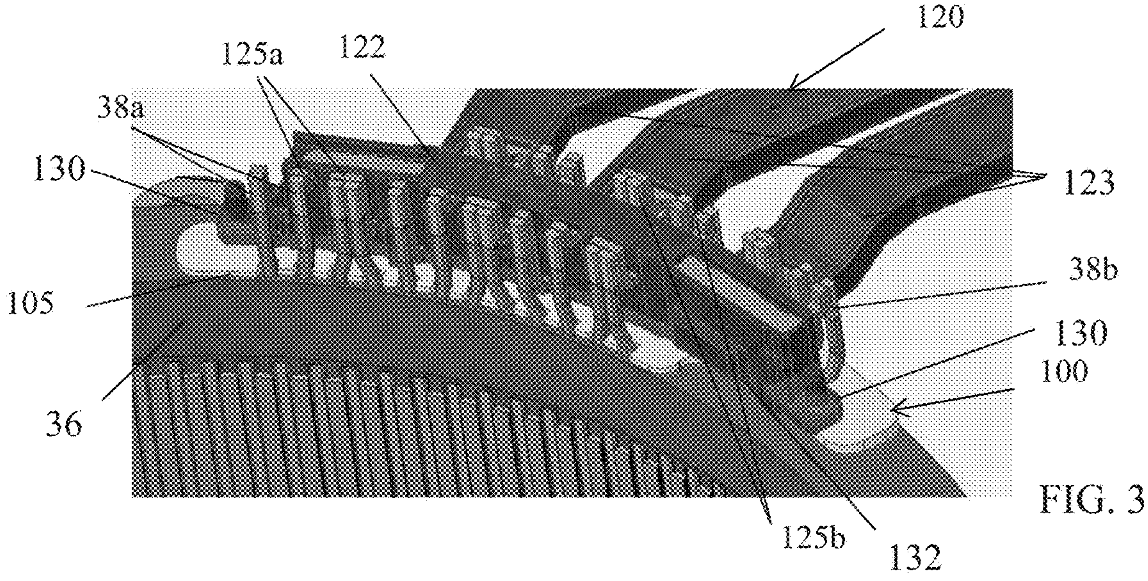
FIG. 3 is an enlarged perspective view of the alignment plate of FIG. 2 and a busbar assembly mounted on the stator core.

With reference now to FIGS. 2 and 3, in at least one embodiment, the alignment plate 100 is provided as a base plate 102 with a planar bottom face 102*a* configured to be supported on the top surface of the end turns 36 or on the top surface of the stator core 22, and a planar upper face 102*b* configured to receive the busbar assembly 120 seated thereon. In the embodiment of FIG. 2, the alignment plate includes an inboard segment 104 and an outboard segment 110 that are circumferentially offset relative to each other. In particular, the inboard segment 104 is arranged to be aligned with the inboard stator leads 38*a*, while the outboard segment 110 is arranged to be aligned with the outboard stator leads 38*b*. It can be appreciated that the circumferential offset, if any, between the inboard and outboard segments of the base plate 102 is determined by the locations of the inboard and outboard stator leads.

Each segment 104, 110 of the alignment plate 100 defines a plurality of features to receive the stator leads therethrough. In the illustrated embodiment, the inboard segment 104 includes a plurality of notches 106 defined in the inboard edge 105 of the base plate 102. The outboard segment 110 defines a plurality of openings 112. In each case, the notches 106 and openings 112 are defined for a close running fit with corresponding stator leads 38*a*, 38*b*. In the embodiment shown in FIGS. 2-3, the leads have a rectangular cross-section, as is common in the art. The notches 106 and openings 112 also have a rectangular cross-section that is slightly larger than the cross-section of the leads so that the leads can be threaded through the notches and openings. The number of notches and openings depends on the number of stator leads 38*a*, 38*b*. In the illustrated embodiment, twelve notches and twelve openings correspond to the twelve inboard and twelve outboard stator leads, as is typical in the art.

The base plate 102 is generally rigid so that the base plate will not bend or flex as the alignment plate 100 is mounted on the stator leads. Moreover, the base plate must be non-conductive. In one specific embodiment, the base plate 102 is formed of a glass-impregnated nylon. The nylon material provides a low-friction surface within the notches 106 and openings 112 to facilitate the movement of the alignment plate over the stator leads 38*a*, 38*b*.

The alignment plate 100 facilitates the engagement of the busbar assembly 120 to the stator assembly 20. As is known in the art, the busbar assembly 120 includes a body 122 from which the phase terminals 123 project. The body 122 engages and supports a plurality of inboard and outboard lead connectors 125*a*, 125*b*, respectively, that are connected to the phase terminals and that are connectable to the respective inboard and outboard stator leads 38*a*, 38*b*. The alignment plate serves to maintain the proper alignment between the stator leads and the lead connectors of the busbar assembly as the busbar assembly is mounted to the stator. As shown in FIG. 1, the alignment plate 100 is positioned above the ends of the stator leads, with each stator lead aligned with a corresponding notch or opening. The alignment plate is then moved downward toward the stator core 22 so that the stator leads enter the corresponding notches and openings. It can be appreciated that the presence of the notches 106 reduces the "fiddle-factor" in aligning all of the stator leads with the notches and openings. The open edge of the notches allows the notches 106 to engage the inboard stator leads 38*a* first, so that the openings 112 should be automatically aligned with the outboard stator leads 38*b*. It is contemplated that the outboard openings can be in the form of notches, like the notches 106, and that the inboard notches can be openings, like the openings 112.

The alignment plate 100 can be advanced partway down the stator leads to maintain the leads in an optimum position to accept the busbar assembly 120. The busbar assembly 120 is engaged to the alignment plate 100 with each of the lead connectors 125*a*, 125*b* in contact with a counterpart one of the stator leads 38*a*, 38*b*, as shown in FIG. 2. It can be appreciated that the body 122 of the busbar assembly can be engaged to the base plate 102 in any manner that maintains the alignment of the busbar lead connectors with the stator leads as the alignment plate 100 is advanced down the stator leads. The body of the busbar assembly can be affixed to the alignment plate, held in direct contact with the alignment plate or pushed into engagement with the base plate to push the alignment plate downward along the stator leads. It can be appreciated that the alignment plate 100 provides structural support for the stator leads as well as for the busbar assembly 120 as it is being assembled with the stator.

Once the alignment plate is pushed against the top surface of the end turns 36, the stator leads 38*a*, 38*b* and corresponding lead connectors 125*a*, 125*b* can fixed in electrically conductive contact, such as by welding the leads together. The leads can be bent as needed, as shown in FIG. 2, for proper electrical connection between stator leads and busbar lead connectors. It can be appreciated that the alignment plate helps minimize any movement of the stator leads during the welding operation. It can be also be appreciated that the alignment plate 100 protects the stator and winding arrangement 30 from the welding operation, since the plate is interposed between the stator and the welding joints.

The alignment plate 100 is sized to be supported on the top surface of the end turns 36 and to provide a top face 102*b* on which the busbar body 122 can be stably supported. In the illustrated embodiment, the alignment plate is sized to span twelve inboard stator leads 38*a* and twelve outboard stator leads 38*b*. Thus, the base plate 102 is curved at the radius of the stator core 22. In a specific embodiment, the alignment plate subtends a length of about 110 mm and a width of about 27.5 mm. Of course, the dimensions would be adjusted based on the dimensions of the stator on which the busbar assembly is to be mounted.

Alignment Plate with Busbar Centering Features

Figure 4:
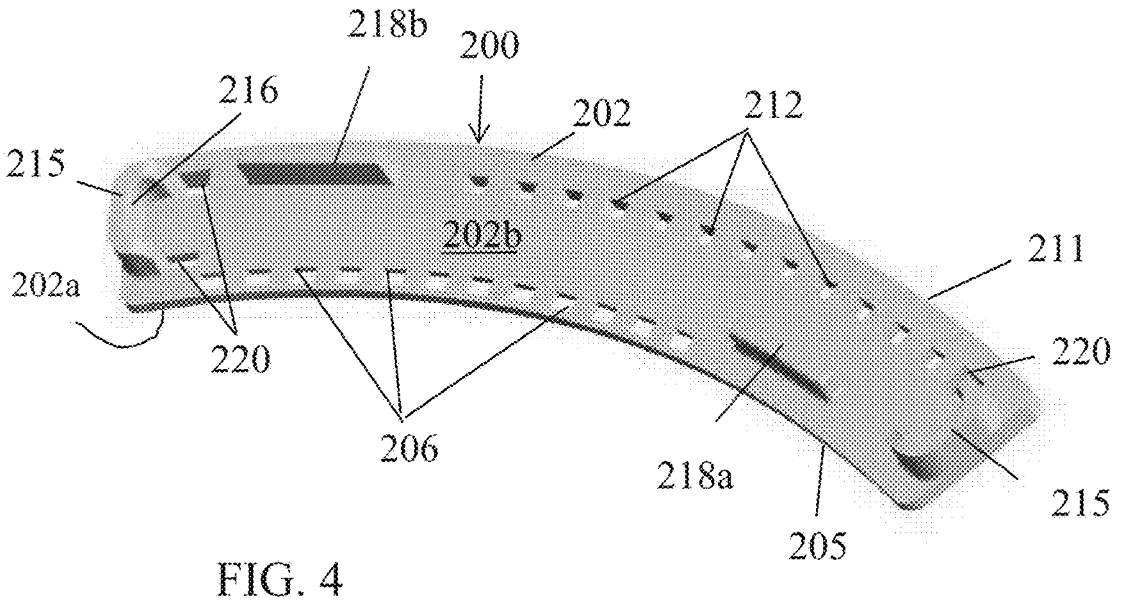
FIG. 4 is a top view of an alignment plate according to another embodiment of the disclosure.
Figure 5:
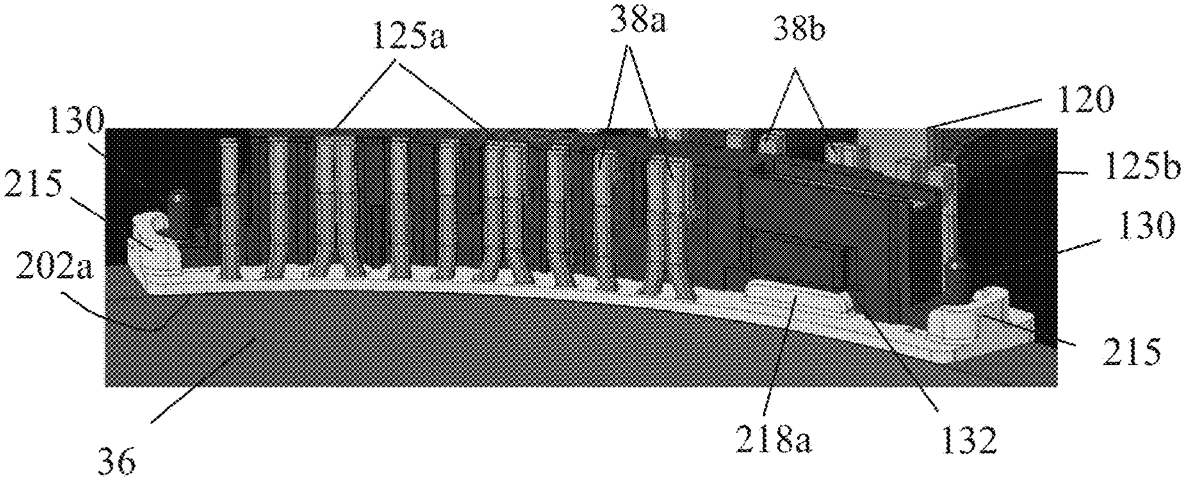
FIG. 5 is an enlarged perspective view of the alignment plate of FIG. 4 and a busbar assembly mounted on a stator core.

An alignment plate 200 in another embodiment shown in FIGS. 4-7 includes features for centering the busbar assembly on the alignment plate. As shown in FIG. 4, the alignment plate 200 includes a base plate 202 that can be formed of the same material as the base plate 102. The base plate includes an inboard edge 205 with a plurality of openings 206 defined through the plate adjacent the inboard edge. An outboard edge 211 includes an adjacent plurality of openings 212. As with the alignment plate 100, the inboard and outboard openings 206, 212 are circumferentially offset relative to each other to coincide with the respective inboard and outboard stator leads 38*a*, 38*b*. As with the openings 112, the openings 206, 212 have a cross-section that corresponds to the cross-section of the stator leads, sized for a close running fit. The base plate 202 is thus configured like the base plate 102 to simultaneously accept all of the stator leads and to be advanced down the leads until the bottom face 202*a* contacts the top surface of the end turns.

Figure 6:
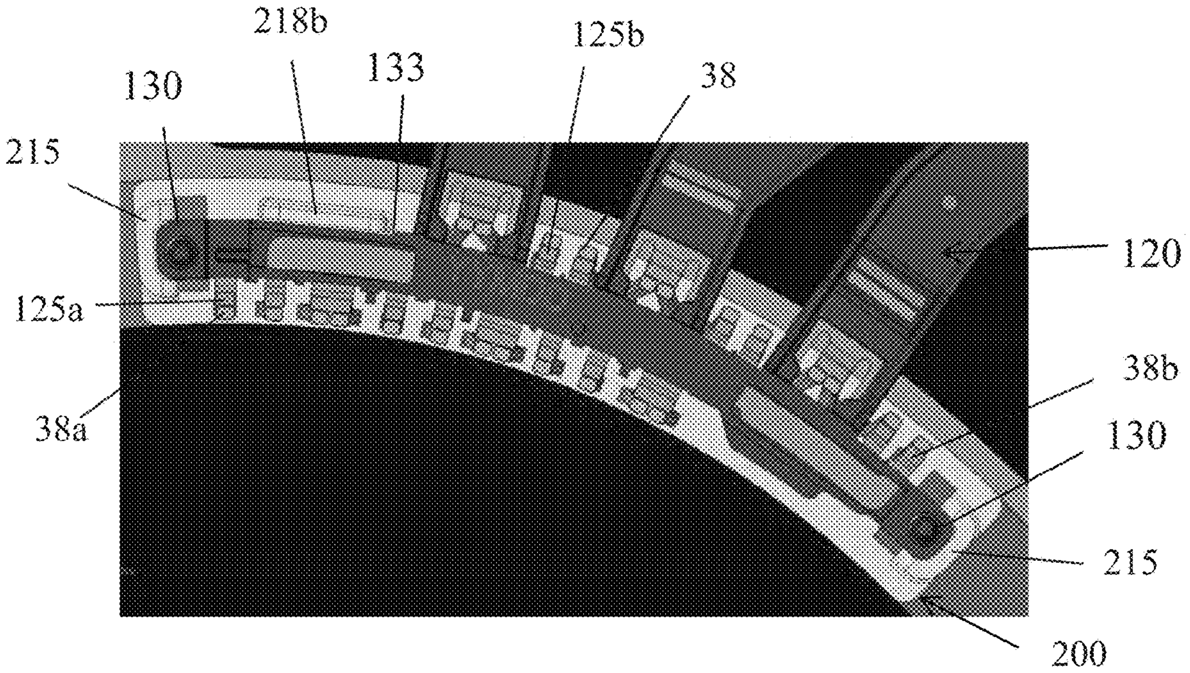
FIG. 6 is a top view of the alignment plate of FIG. 4 and the busbar assembly mounted on the stator core shown in FIG. 5.

In this embodiment, the alignment plate 200 includes four features for centering the busbar assembly 120 on the top face 202*b* of the base plate. In particular, the alignment plate includes upward projecting flanges 215 at the opposite ends of the base plate. The flanges 215 define recesses 216 that are sized and configured to receive bosses 130 at the opposite ends of the busbar assembly, as best seen in FIG. 6. The alignment plate further includes an inboard rib 218*a* adjacent the inboard edge 205 of the base plate, and an outboard rib 218*b* adjacent the outboard edge 211 of the base plate. The ribs 218*a*, 218*b* are radially offset from each other by a distance slightly greater than the radial width of the body 122 of the busbar assembly 120. The ribs 218*a*, 218*b* are circumferentially offset to be near the opposite ends of the busbar body and to accommodate the circumferentially offset inboard and outboard openings 206, 212. The end flanges 215 and ribs 218*a*, 218*b* cooperate to center the busbar body 122 properly on the base plate. More specifically, the flanges and ribs center the busbar body on the base plate so that the lead connectors 125*a*, 125*b* are arranged directly adjacent a corresponding one of the openings 206, 212. The busbar body can define recesses 132, 133 for receiving a corresponding rib 218*a*, 218*b*.

Figure 7:
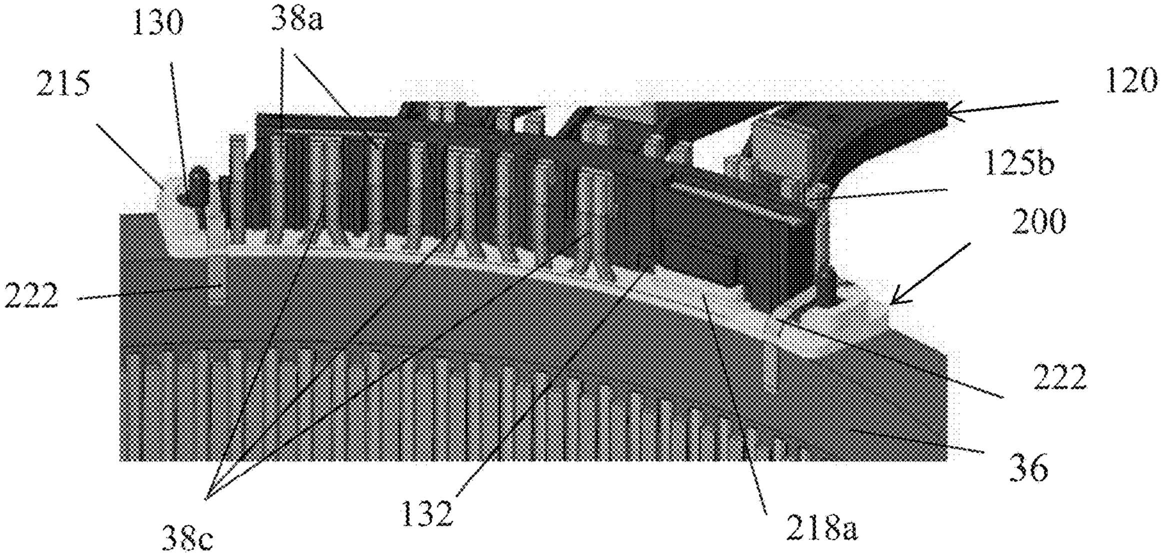
FIG. 7 is an enlarged perspective view of the alignment plate of FIG. 4 and the busbar assembly mounted on the stator core, as in FIG. 5, with a cable tie fixing the components together.

The alignment plate 200 can include a further feature for fixing the busbar assembly to the stator. In one embodiment, the base plate 202 can define one or more pairs of openings 220, preferably with a pair of openings at each end of the plate as best seen in FIGS. 4, 7. The openings 220 are sized to receive a strap 222 as shown in FIG. 7. The strap 222 can traverse the end bosses 130 of the busbar body 122, pass through the openings 220 on either side of the busbar body, and through an opening in the top surface of the end turns 36 (i.e., passages between conductors). The straps 222 can be conventional cable ties that can be tightened by pulling the free end of the strap. Once tightened, the straps hold the busbar body firmly on the alignment plate and end turns 36, essentially eliminating any movement of the busbar assembly, particularly during the process of welding the leads.

Alignment Plate with Double Lead Openings and Chamfers

Figure 8:
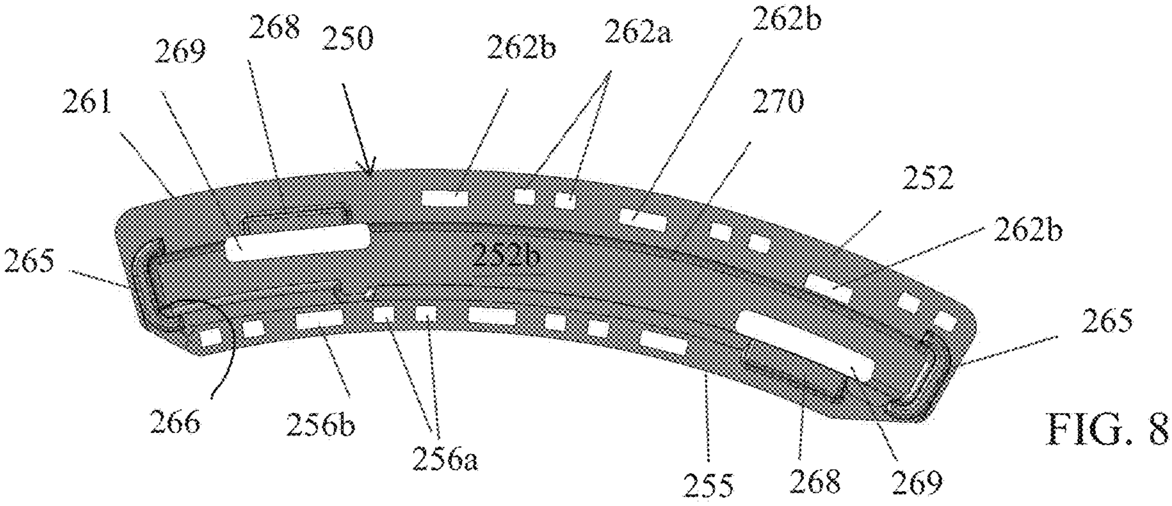
FIG. 8 is a top view of an alignment plate according to a further embodiment of the disclosure.
Figure 9:
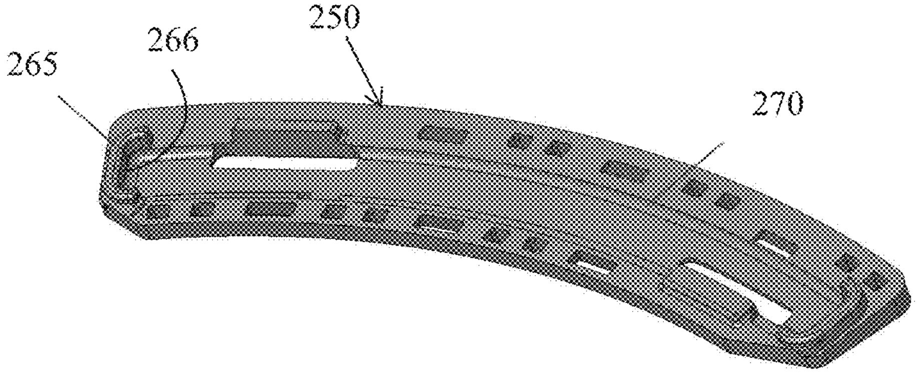
FIG. 9 is a top perspective view of the alignment plate shown in FIG. 8.
Figure 10:
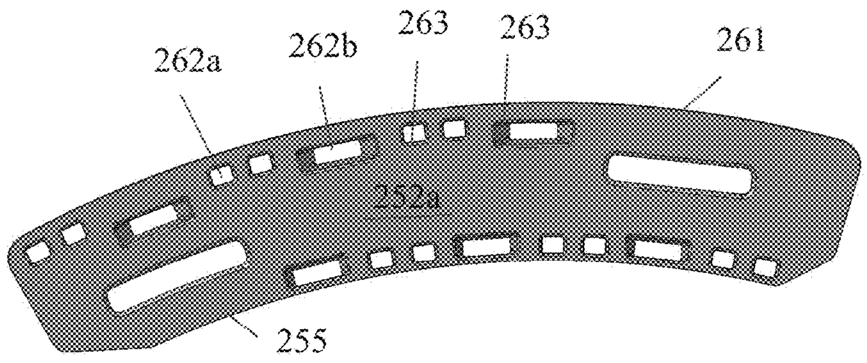
FIG. 10 is a bottom view of the alignment plate shown in FIG. 8.

An alignment plate 250 of another embodiment, shown in FIGS. 8-10, includes a base plate 252 with a planar bottom face 252*a* for mounting on the top surface of the end turns 36, as with the base plates of the previous embodiments. The base plate defines a plurality of openings 256*a*, 256*b* adjacent the inboard edge 255, and a plurality of openings 262*a*, 262*b* adjacent the outboard edge 261. The two sets of openings are circumferentially offset from each other and are arranged to accept the stator leads 38, as described above with respect to the other alignment plates. In this embodiment, certain openings 256*a*, 262*a* are sized to receive a single stator lead, while other openings 256*b*, 262*b* are sized to receive two stator leads. The single lead openings 256*a*, 262*a* have a cross-section like the stator lead, sized to provide a close running fit. The openings 256*b*, 262*b* are aligned with adjacent pairs of stator leads that are electrically connected to each other, such as the lead pairs 38*c* shown in FIG. 7. The circumferential width of the double lead openings 256*b*, 262*b* is sufficient to span the lead pairs 38*c* with a gap between the leads. The double lead openings 262*b* adjacent the outboard edge can be offset radially relative to each other and to the single lead openings 262*a*, depending on the arrangement of the outboard stator leads 38*b*.

In one feature of the alignment plate 250, the openings 256*a, b* and 262*a, b* can define a chamfer 263 at the bottom face 252*a* of the base plate. The chamfer can extend around the perimeter of each opening, as shown in FIG. 10. The chamfer essentially extends the size of the opening on the bottom face 252*a* that faces the ends of the stator leads when the alignment plate 250 is positioned above the leads. The chamfers 263 help guide the alignment plate into proper alignment on the stator leads as the plate is moved downward onto the stator leads 38*a, b*. Once all of the leads extend through the respective inboard and outboard openings in the base plate 252, the alignment plate is fully aligned with the leads and able to accurately guide the busbar assembly into electrical contact with the leads, as described above.

Like the alignment plate 200, the alignment plate 250 includes end flanges 265 projecting from the top face 252*b* of the base plate 252. The flanges define a recess 266 for receiving the end bosses 130 of the busbar assembly 120, as described above. The alignment plate 250 also includes centering ribs 268 that project upward from the top face to be received within alignment recesses 132, 133 in the busbar body 122, as described above. In this embodiment, the base plate 242 defines elongated openings 269 inboard from the centering ribs 268, as shown in FIG. 8. The openings can receive a corresponding rib (not shown) projecting from the underside of the busbar body 122 to enhance the engagement between the busbar assembly and the alignment plate 250. Likewise, the base plate 252 can define a continuous channel 270 in board of the end flanges 265 and centering ribs 268 that can receive a peripheral rib (not shown) on the underside of the busbar body, to further enhance the placement of the busbar assembly on the alignment plate.

Alignment Plate with End Turn Compartments, Ledged Openings and Epoxy Fit

When implementing various embodiments of the alignment plates disclosed herein, it would be of further advantage to provide an alignment plate that further assists with maintaining the connections between the busbar and any associated welds of the winding arrangement over time, thus resulting in an even stronger and more robust electric machine capable of withstanding vigorous and repeated vibration during use of the electric machine in various applications. Accordingly, another embodiment of an alignment plate 300 is shown in FIGS. 13-19. In this embodiment, the alignment plate 300 includes a contoured bottom face/surface 308 that includes end retainers 310 with weld compartments 314 on the respective ends of the alignment plate 300. The end retainers 310 are configured to receive tops of the common welds of the winding arrangement. The alignment plate further comprises ledges 330 formed in each of the openings 306, 312 that receive the leads 38 (which openings may also be referred to herein as "lead holes"). Epoxy 340 is added to each of the lead holes 306, 312 and is also used to bond the alignment plate 300 to the busbar 320.

Figure 13:
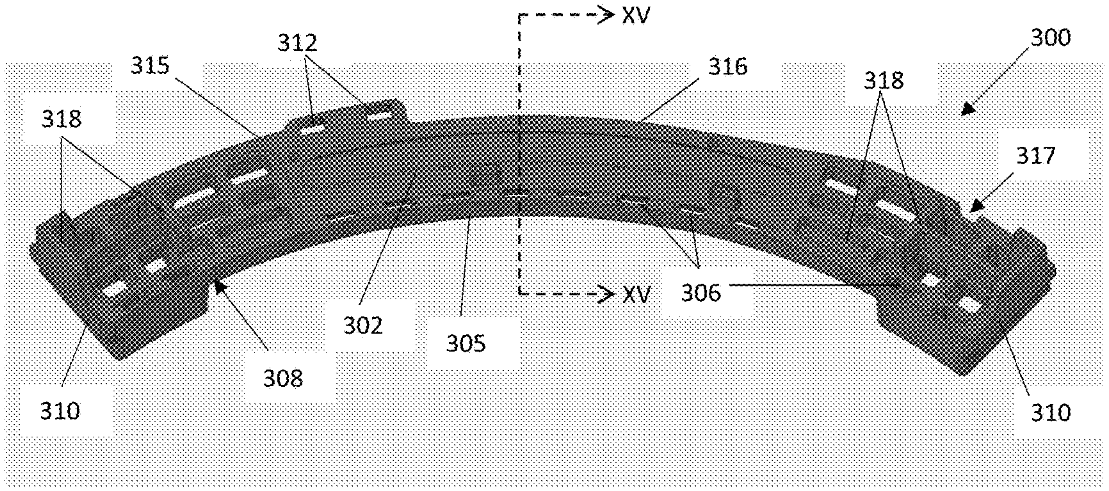
FIG. 13 is a perspective view of a top side of an alignment plate for use in association with the stator assembly of FIG. 11.

With particular reference now to FIG. 13, the alignment plate 300 is provided by a base plate 302 that can be formed of the same material as the base plate 102 described previously herein (e.g., glass-impregnated nylon or other plastic, which may be referred to herein as a "plastic component"). The base plate 302 includes an inboard edge 305 with a plurality of lead holes 306 defined through the plate adjacent the inboard edge. The inboard stator leads 38*a* are configured to be inserted through the lead holes 306. An outboard edge 315 includes an adjacent plurality of lead holes 312. The outboard edge 315 further includes one or more notches 317 and as well as smooth surface portions 316. The outboard stator leads 38*b* are inserted through the lead holes 312, arranged in the notches 317, and/or abut against the smooth surface portions 316 along the outboard edge 315. As with the alignment plate 100, the inboard and outboard openings 306, 312 (as well as the notches 317 and smooth surface portions 316) are circumferentially offset relative to each other to coincide with the respective inboard and outboard stator leads 38_a_, 38_b_. As with the openings 112, the openings 306, 312 have a cross-section that corresponds to the cross-section of the stator leads, sized for a tight, close running fit. The base plate 302 is thus configured similar to the base plate 102 to simultaneously accept at least some of the stator leads and to be advanced down the leads until the bottom face of the base plate 302 engages the top surface of the end turns. Similar to other embodiments of the base plate disclosed herein, the base plate 302 also includes features 318 designed to assist with busbar retention. However, as explained in the paragraphs below, it will be recognized that alignment plate 300 of FIGS. 13-19 also includes a number of additional advantages and features not disclosed in association with other embodiments described herein.

Figure 14:
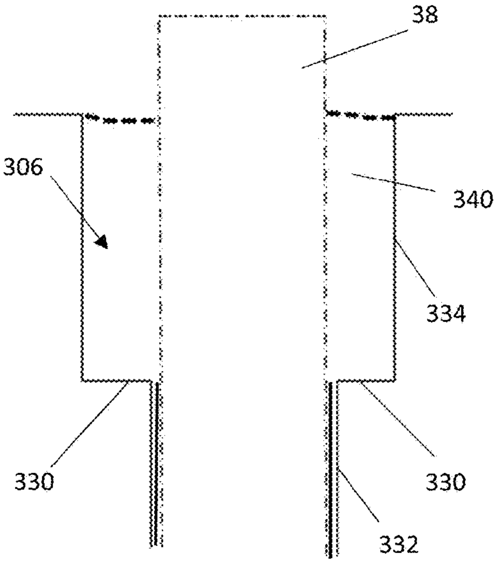
FIG. 14 is a cross-sectional view of a hole in the alignment plate along section XIV-XIV of FIG. 13 with the position of an exemplary conductor and associated epoxy shown in dashed lines.

With reference now to FIG. 14, a cross section of one of the inboard lead holes 306 of FIG. 13 is shown along lines XIV-XIV of FIG. 13. The walls of the lead hole 306 are illustrated in solid lines, and an exemplary winding lead 38 is illustrated in dot-and-dashed lines. As will be recognized from FIG. 15, the lead hole 306 has a dual diameter configuration with a lower end diameter that is less than an upper end diameter. A ledge 330 is formed in the lead hole 306 and separates the lead hole into two parts. A lower portion 332 of the lead hole below the ledge 330 has a first diameter. An upper portion 334 of the lead hole above the ledge 330 has a second diameter that is less than the first diameter. The lower portion 332 is configured to tightly receive the lead 38 with the sides of the lead 38 abutting the walls of the lead hole 306 in a friction fit on the lower portion 332 of the lead hole. In another embodiment, the lower portion 332 is configured to receive the lead 38 in a clearance fit, but a close-fitting clearance fit. The upper portion 334 is significantly greater in diameter than the lower portion 332 (e.g., 10%-50% greater) such that the sides of the lead 38 do not abut the walls of the lead hole 306 on the upper portion 334 of the lead hole. This larger diameter results in extra space in the lead hole 306 for an epoxy 340 (or similar adhesive polymer material) to be inserted into the upper portion 334 and surround the associated lead 38. The epoxy 340 is inserted into the upper portion 334 such that the upper portion is completely filled or nearly filled with epoxy (as noted by the bold dashed lines in FIG. 14). The ledges 330 assist in retaining the epoxy 340 within the upper portion 334 of the lead hole. When the epoxy cures, a solid bond is formed between the lead 38 and the walls at the upper portion 334 of the lead hole 306, thus further securing the lead 38 to the alignment plate 300. While only one lead hole 306 is illustrated in FIG. 14, it will be recognized that many or all of the lead holes 306, 312 of the base plate 302 may be formed with ledges 330 and a dual-diameter configuration with epoxy 340 in an upper portion 334 of the lead hole.

Figure 15:
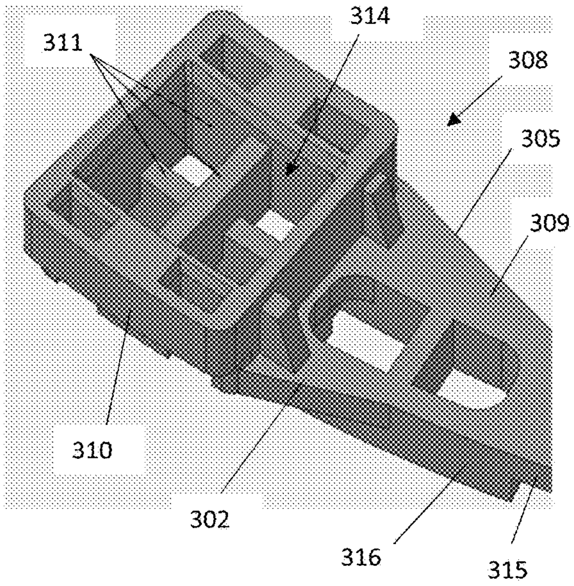
FIG. 15 is a perspective view of a bottom side of one end of the alignment plate of FIG. 13.

With reference now to FIG. 15, a bottom surface/underside 308 of one end of the base plate 302 of FIG. 13 is shown. The bottom surface includes a planar central portion 309 and two end retainers 310. The end retainers 310 project outwardly (i.e., downwardly) on the bottom face of the base plate and include a plurality of walls 311 that form compartments 314. The compartments 314 are configured to receive and entrap some of the common welds forming the end turns 36 of the winding arrangement. The top portions of selected end turns 36 fit within the compartments 314 and the end turns 36 abut the walls 311 of each compartment. The compartments 314 assist in securing the base plate 302 on the end turns in a friction-fit arrangement. In addition, epoxy 340 may also be inserted into the compartments (e.g., via holes in the top of the compartments) in order to further secure the base plate 302 to the end turns.

Figure 11:
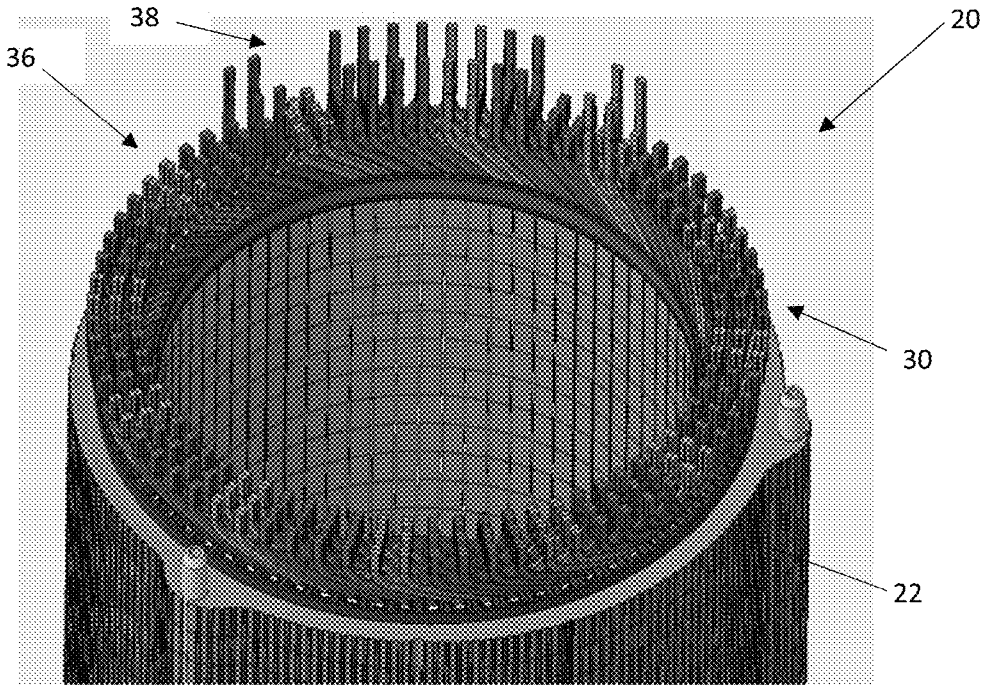
FIG. 11 is a perspective view of another embodiment of the stator assembly for an electric machine of FIG. 1 with the stator assembly shown in isolation from the busbar assembly in order to expose the leads of the winding arrangement.
Figure 12:
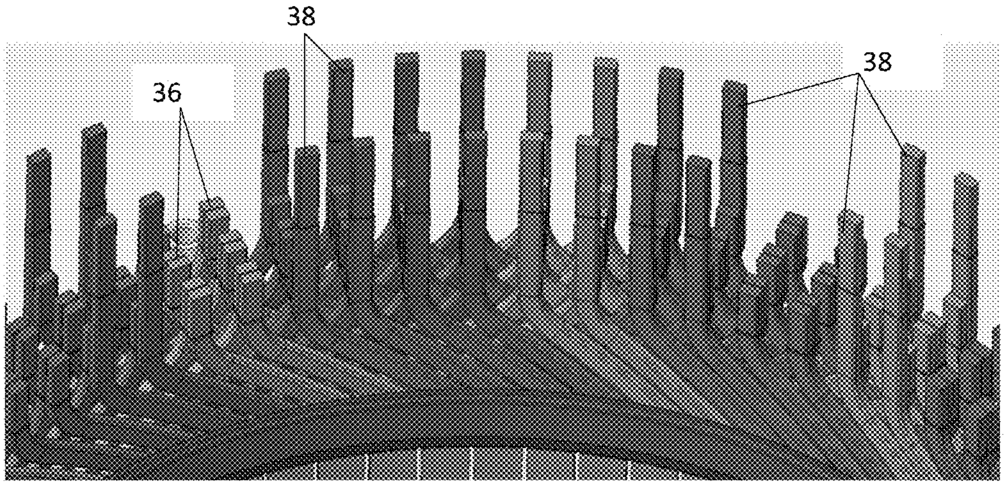
FIG. 12 is an enlarged perspective view of the leads of FIG. 11.

Similar to other embodiments disclosed herein, the alignment plate 300 is configured to be positioned on the end turns 36 of a winding arrangement 30 with the bottom surface of the base plate 302 contacting the end turns 36, and the leads 38 of the winding arrangement extending through the openings 306, 312 in the base plate 302. FIGS. 11 and 12 illustrate a winding arrangement 30 positioned on a stator core 22 and configured to receive the alignment plate 300 disclosed herein. The winding arrangement 30 includes a plurality of end turns 36 formed by common welds at the ends of segmented conductors. A plurality of leads 38 extend axially above the end turns at one end of the stator.

Figure 16:
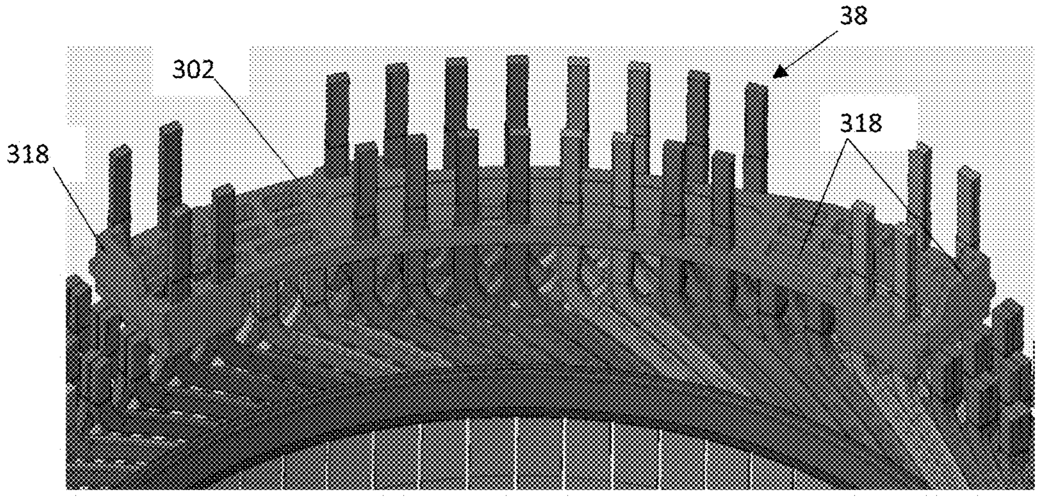
FIG. 16 is a perspective the alignment plate of FIG. 13 positioned on the leads of FIG. 12.

FIG. 16 illustrates the alignment plate 300 positioned on the end turns 36 of the winding arrangement 30 of FIG. 11. The leads 38 either extend through the lead holes 306, 312 in the base plate 302, engage the notches 317, or engage the smooth surface portion 316 on the outboard edge 315 of the base plate 302. As noted previously, when the base plate 302 is positioned on the end turns 36, the compartments 314 of the end retainers 310 receive the end portions of the end turns 36 in a friction fit. At the same time the more central portion 309 of the bottom surface 308 of the base plate 302 rests on the top surface of other end turns. With the base plate 302 in this position, epoxy 340 can be inserted into the upper portions 334 of the lead holes 306, 312 and possibly also into the compartments 314 of the end retainers 310. Epoxy 340 may also be inserted in various indentations or in contact with other features 318 on the upper surface of the base plate 302 prior to engagement of the busbar 320 with the base plate 302.

Figure 17:
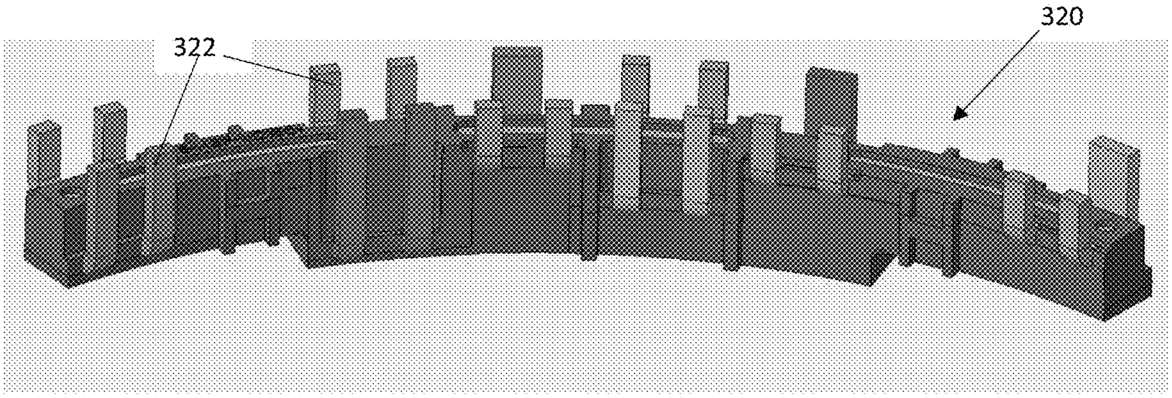
FIG. 17 is a perspective view of a busbar assembly for use in association with the alignment plate of FIG. 13.
Figure 18:
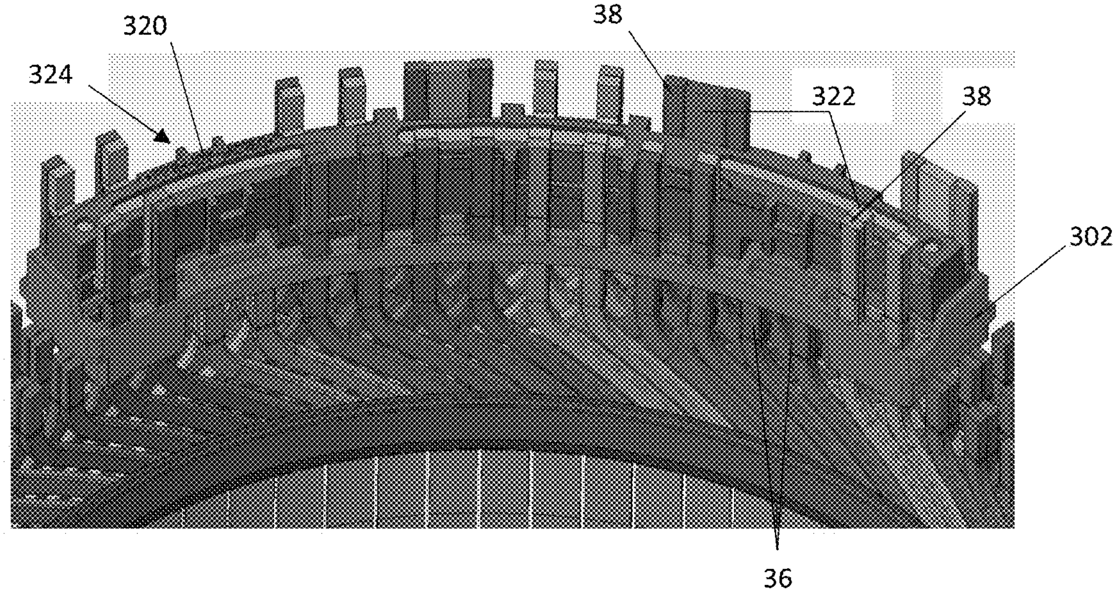
FIG. 18 is a perspective view of the busbar assembly of FIG. 17 and alignment plate of FIG. 13 arranged on a winding arrangement of a stator.
Figure 19:
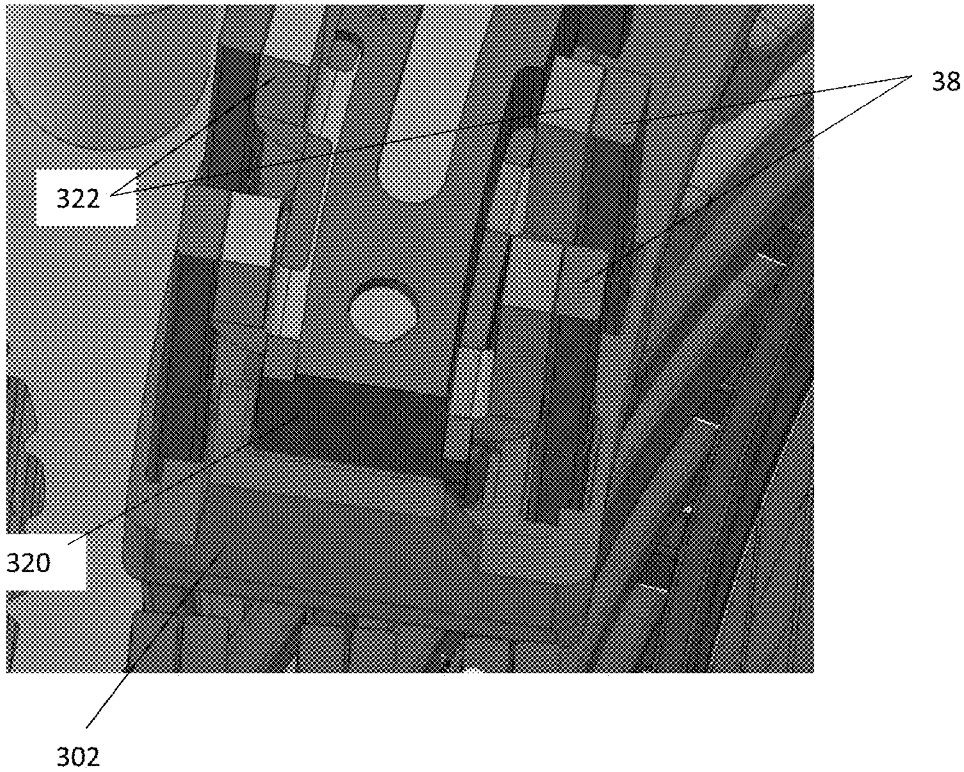
FIG. 19 shows an enlarged view of an end portion of the busbar assembly and alignment plate of FIG. 18.

With reference now to FIGS. 17-19, the busbar assembly 324 is shown including the busbar 320 and the base plate 302, which together form the busbar assembly 324. FIG. 17 shows the busbar 320 in isolation from the base plate 302. FIGS. 18 and 19 show the busbar 320 positioned on the base plate 302 with conductors 322 of the busbar 320 aligned with various leads 38 of the winding arrangement 30. The busbar 320 is positioned on the base plate 302 soon after the epoxy 340 is inserted onto the base plate 302 and remains uncured. When various features on the busbar 320 come into contact with complementary features on the base plate 302 that received epoxy (e.g., features similar to any of those included with the embodiments disclosed herein), the epoxy is distributed to the busbar 320. When the epoxy cures, a secure bond is formed between the busbar 320 and the base plate 302, forming a busbar assembly 324.

As will be recognized from the foregoing description, in at least one embodiment, the faces of the base plate 300 are not flat, but are instead contoured with multiple projecting features such as the end retainers 310 with compartments 314 that fit over and surround, multiple common welds on end turns of the stator winding. Epoxy 340 is added to the holes 306, 312 which surround the leads. Epoxy is also used to bond the base plate 302 to busbar 320. The compartments 314 and epoxy 340 help to bond and solidify (i) the stator end turns 36 leads 38 to the base plate 302, (ii) the base plate 302 to the busbar 320, and (iii) the base plate 302 to the common welds of the stator. This embodiment advantageously locks the entire assembly together on the stator and prevents cracking or other damage at the common welds. Advantageously, the embodiment results in a busbar assembly that is significantly stiffer and has a substantially increased resonant frequency (e.g., from about 220 HZ to about 480 HZ with the disclosed embodiment), thus making the part much more robust and resistant to damage from prolonged exposure to vibration.

In another embodiment (not shown) the plastic portion of the busbar assembly 324 is comprised of a busbar 320 and the alignment plate 300 which are formed as a monolithic construction formed of a single unitary component. This design eliminates the epoxy used in the first embodiment to bond the base plate 302 to the busbar 320.

The foregoing detailed description of one or more embodiments of the base plate and busbar assembly for an electric machine has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

Various embodiments are presented in the drawings and in the accompanying description. Alternate embodiments of the present disclosure and their equivalents may be devised without parting from the spirit or scope of the present disclosure. It should be noted that any discussion herein regarding “one embodiment”, “an embodiment”, “an exemplary embodiment”, and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

What is claimed is:

1. An electric machine comprising:

a stator including a winding arrangement with a plurality of stator leads projecting from a stator core and a plurality of end turns at a top surface of the stator core; and a busbar assembly coupled to the stator, the busbar assembly comprising a busbar body and an alignment plate, the busbar body engaging a plurality of lead connectors corresponding to the plurality of stator leads, the alignment plate having a bottom face configured to be seated on the end turns, and a plurality of openings defined through said alignment plate, said plurality of openings corresponding to said plurality of stator leads and arranged on said alignment plate to be aligned with and receive the plurality of stator leads when the bottom face is seated on the end turns, each opening of said plurality of openings sized and configured for a close running fit with a corresponding one or a corresponding pair of said stator leads aligned with said opening, said alignment plate defining a base plate with a top face and the bottom face, wherein at least one retainer extending from said bottom face defines a compartment configured to receive at least one of the plurality of end turns.

2. The electric machine of claim 1, wherein at least one of the plurality of opening of said plurality of openings includes a lower first portion having a smaller diameter than an upper second portion.

3. The electric machine of claim 1 further comprising epoxy in at least one of the plurality of openings.

4. The electric machine of claim 3, wherein each of said plurality of openings includes a chamfer defined at said bottom face of said base plate.

5. The electric machine of claim 3, in which the stator core is cylindrical with an inner perimeter surface and an outer perimeter surface, wherein the alignment plate is arcuate with an inboard edge and an opposite outboard edge that are generally contiguous with or between the inner and outer perimeter surfaces, respectively, when the base plate is seated on the end turns.

6. The electric machine of claim 5, wherein said plurality of openings includes a first plurality of openings adjacent said inboard edge and a second plurality of openings adjacent said outboard edge.

7. The electric machine of claim 6, wherein at least one of said first plurality of openings and said second plurality of openings is a plurality of notches defined in the respective inboard edge and outboard edge.

8. The electric machine of claim 6, wherein said first and second plurality of openings are circumferentially offset from each other along the arcuate base plate.

9. The electric machine of claim 8, wherein the base plate includes at least one rib projecting upward from said top face adjacent one of the inboard edge and the outboard edge.

10. The electric machine of claim 1, wherein the alignment plate and the busbar body are two separate pieces.

11. The electric machine of claim 1, wherein the alignment plate and the busbar body are a monolithic construction provided by a single unitary component.

12. The electric machine of claim 1, wherein the compartment surrounds a weld formed on the at least one of the plurality of end turns.

13. An electric machine comprising:

a stator assembly including a stator core having opposite ends and a winding arrangement positioned on the core, the winding arrangement including a plurality of stator leads extending outward from one of the ends of the core and a plurality of end turns at said one of the ends of the core; and a busbar assembly including:

a busbar body supporting a plurality of lead connectors, each of the plurality of lead connectors connected to at least one of said plurality of stator leads; and an alignment plate interposed between said stator assembly and said busbar body, said alignment plate including:

a base plate with a bottom face supported on the end turns and an opposite top face supporting the busbar body;

a plurality of openings defined through the alignment plate, said plurality of openings corresponding to said plurality of stator leads and arranged on said base plate to be aligned with the plurality of stator leads, one or more of the stator leads extending through a corresponding one of said plurality of openings, wherein each of said corresponding one of said plurality of openings is sized and configured for a close running fit with said one or more stator leads extending therethrough; and at least one retainer that extends from said bottom face and defines a compartment configured to receive at least one of the plurality of end turns.

14. The electric machine of claim 13 further comprising epoxy positioned in at least one opening of said plurality of openings and surrounding said one or more stator leads extending therethrough.

15. The electric machine of claim 14, wherein at least one opening of said plurality of openings includes a lower first portion having a smaller diameter than an upper second portion.

16. The electric machine of claim 13 wherein the alignment plate and the busbar are two separate.

17. The electric machine of claim 13 wherein the alignment plate and the busbar are a monolithic construction formed of a single unitary component.

18. The electric machine of claim 13, wherein:

the stator core is cylindrical with an inner perimeter surface and an outer perimeter surface;

said base plate is rigid and arcuate with an inboard edge and an opposite outboard edge that are generally contiguous with or between the inner and outer perimeter surfaces, respectively;

said stator includes a first plurality of stator leads adjacent said inner perimeter surface and a second plurality of stator leads adjacent said outer perimeter surface; and said plurality of openings includes a first plurality of openings adjacent said inboard edge receiving said first plurality of stator leads, and a second plurality of openings adjacent said outboard edge receiving said second plurality of stator leads.

19. An electric machine comprising:

a stator assembly including a stator core having opposite ends and a winding arrangement positioned on the core, the winding arrangement including a plurality of stator leads extending outward from one of the ends of the core and a plurality of end turns at said one of the ends of the core;

a busbar body supporting a plurality of lead connectors, each of the plurality of lead connectors connected to at least one of said plurality of stator leads; and an alignment plate interposed between said stator assembly and said busbar body, said alignment plate including a plurality of openings defined through the alignment plate, said plurality of openings corresponding to said plurality of stator leads and arranged on said alignment plate to be aligned with the plurality of stator leads, one or more of the stator leads extending through a corresponding one of said plurality of openings, wherein each of said corresponding one of said plurality of openings is sized and configured for a close running fit with said one or more stator leads extending therethrough; and epoxy positioned in at least one opening of said plurality of openings and surrounding said one or more stator leads extending therethrough.

20. The electric machine of claim 19, wherein at least one opening of said plurality of openings includes a lower first portion having a smaller diameter than an upper second portion.

21. An electric machine comprising:

a stator including a winding arrangement with a plurality of stator leads projecting from a stator core and a plurality of end turns at a top surface of the stator core; and a busbar assembly coupled to the stator, the busbar assembly comprising a busbar body and an alignment plate, the busbar body engaging a plurality of lead connectors corresponding to the plurality of stator leads, the alignment plate having a bottom face configured to be seated on the end turns, and a plurality of openings defined through said alignment plate, said plurality of openings corresponding to said plurality of stator leads and arranged on said alignment plate to be aligned with and receive the plurality of stator leads when the bottom face is seated on the end turns, each opening of said plurality of openings sized and configured for a close running fit with a corresponding one or a corresponding pair of said stator leads aligned with said opening, wherein the alignment plate includes a plastic component, wherein the plastic component of the alignment plate and the busbar body are two separate pieces that are bonded together with an epoxy.

22. An electric machine comprising:

a stator including a winding arrangement with a plurality of stator leads projecting from a stator core and a plurality of end turns at a top surface of the stator core; and a busbar assembly coupled to the stator, the busbar assembly comprising a busbar body and an alignment plate, the busbar body engaging a plurality of lead connectors corresponding to the plurality of stator leads, the alignment plate having a bottom face configured to be seated on the end turns, and a plurality of openings defined through said alignment plate, said plurality of openings corresponding to said plurality of stator leads and arranged on said alignment plate to be aligned with and receive the plurality of stator leads when the bottom face is seated on the end turns, each opening of said plurality of openings sized and configured for a close running fit with a corresponding one or a corresponding pair of said stator leads aligned with said opening, wherein the alignment plate includes a plastic component, wherein the plastic component of the alignment plate and the busbar body are a monolithic construction provided by a single unitary component.

* * * * *